US012565333B2

(12) United States Patent
Dobbin

(10) Patent No.: US 12,565,333 B2
(45) Date of Patent: Mar. 3, 2026

(54) JIG FOR SPARK CONTAINMENT CAPS

(71) Applicant: AIRBUS OPERATIONS LIMITED, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 19/017,007

(22) Filed: Jan. 10, 2025

(65) Prior Publication Data

US 2025/0229913 A1 Jul. 17, 2025

(30) Foreign Application Priority Data

Jan. 11, 2024 (GB) ..................................... 2400425

(51) Int. Cl.
| | |
|---|---|
| *B64F 5/10* | (2017.01) |
| *B64D 45/02* | (2006.01) |
| *F16B 37/14* | (2006.01) |

(52) U.S. Cl.
CPC ................ *B64F 5/10* (2017.01); *F16B 37/14* (2013.01); *B64D 45/02* (2013.01); *F05D 2260/231* (2013.01)

(58) Field of Classification Search
CPC .......... B64F 5/10; B64F 5/45; F05D 2230/52; F05D 2240/91; F05D 2260/231; F16B 33/004; F16B 37/14; B64D 45/02; B64D 37/32
See application file for complete search history.

(56) References Cited

U.S. PATENT DOCUMENTS

| | | | |
|---|---|---|---|
| 11,254,443 | B2 | 2/2022 | Dobbin |
| 11,702,225 | B2 | 7/2023 | Akamatsu et al. |
| 2003/0098546 | A1 | 5/2003 | Beyssac et al. |
| 2014/0209736 | A1 | 7/2014 | Nishimura et al. |
| 2016/0195125 | A1 | 7/2016 | Dobbin |

(Continued)

FOREIGN PATENT DOCUMENTS

| | | |
|---|---|---|
| DE | 3046291 A1 | 7/1982 |
| EP | 3 961 055 A1 | 3/2022 |

(Continued)

OTHER PUBLICATIONS

Combined Search and Examination Report for GB2400425.1, dated Jul. 1, 2024, 6 pages.

(Continued)

*Primary Examiner* — Christopher J. Besler
(74) *Attorney, Agent, or Firm* — Nixon & Vanderhye, PC

(57) ABSTRACT

A method of securing a first structure to a second structure is disclosed including providing a jig assembly having spark containment caps carried by a jig; mounting the jig assembly on a structure so that the spark containment caps and the jig contact the first structure; securing the spark containment caps to the first structure by injecting adhesive material into contact with the first structure and the spark containment caps and then curing the adhesive material; removing the jig after the adhesive material has cured; and securing the first structure to the second structure with fasteners, each fastener having a tail which is inserted through the first and second structures and into a respective one of the spark containment caps.

19 Claims, 11 Drawing Sheets

(56)                        References Cited

U.S. PATENT DOCUMENTS

| | | |
|---|---|---|
| 2021/0221532 A1 | 7/2021 | Akamatsu et al. |
| 2022/0063837 A1 | 3/2022 | Dobbin |
| 2022/0135246 A1 | 5/2022 | Dobbin |
| 2022/0136551 A1 | 5/2022 | Dobbin et al. |
| 2023/0002073 A1 | 1/2023 | Dobbin et al. |

FOREIGN PATENT DOCUMENTS

| | | | | |
|---|---|---|---|---|
| WO | WO-2020239881 A1 * | 12/2020 | ............. | B64D 45/02 |
| WO | 2024227584 A1 | 11/2024 | | |

OTHER PUBLICATIONS

Extended European Search Report for Application No. 24221004.5, seven pages, dated May 13, 2025.

* cited by examiner

*FIG. 5*            *FIG. 6*
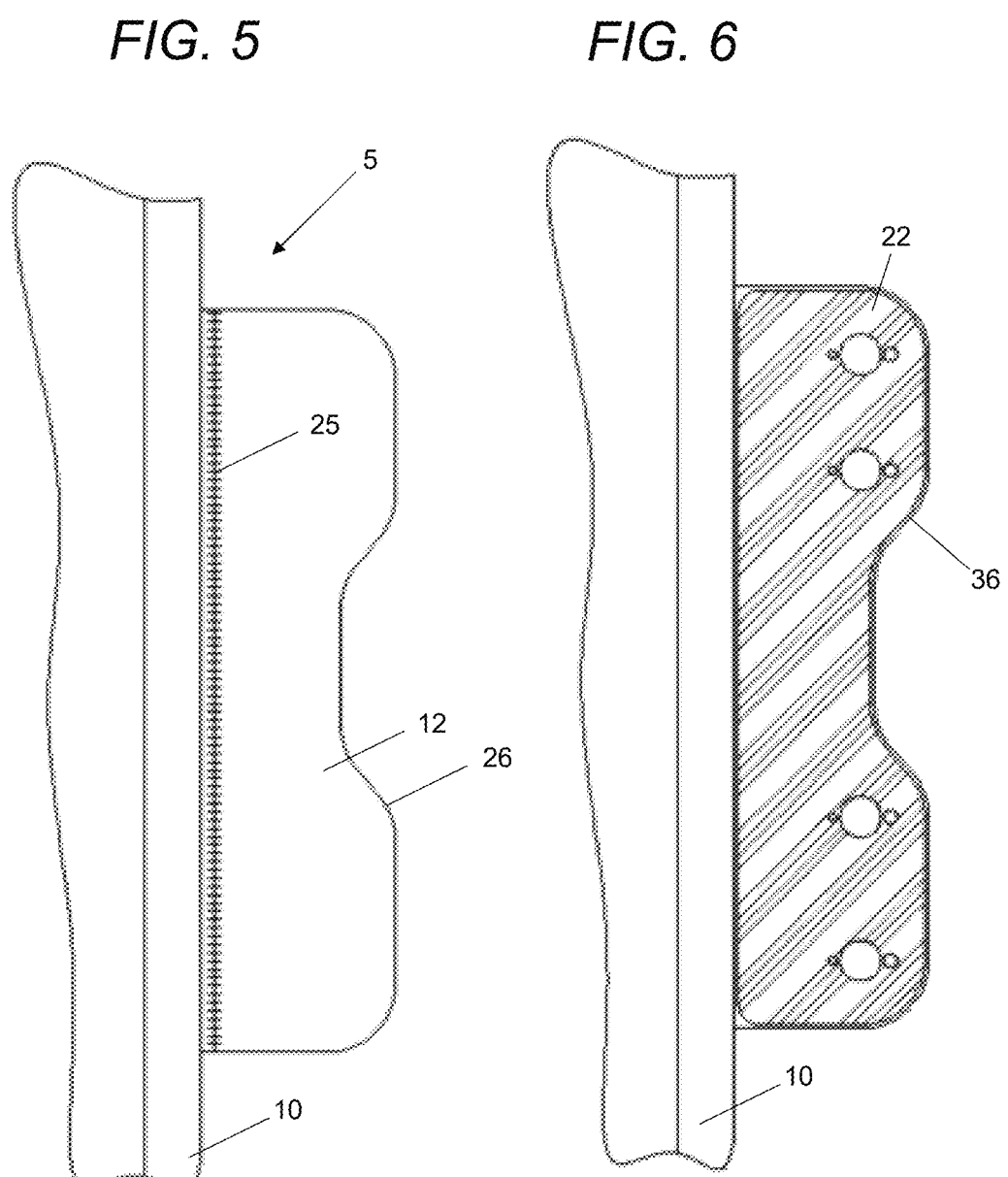

*FIG. 21*
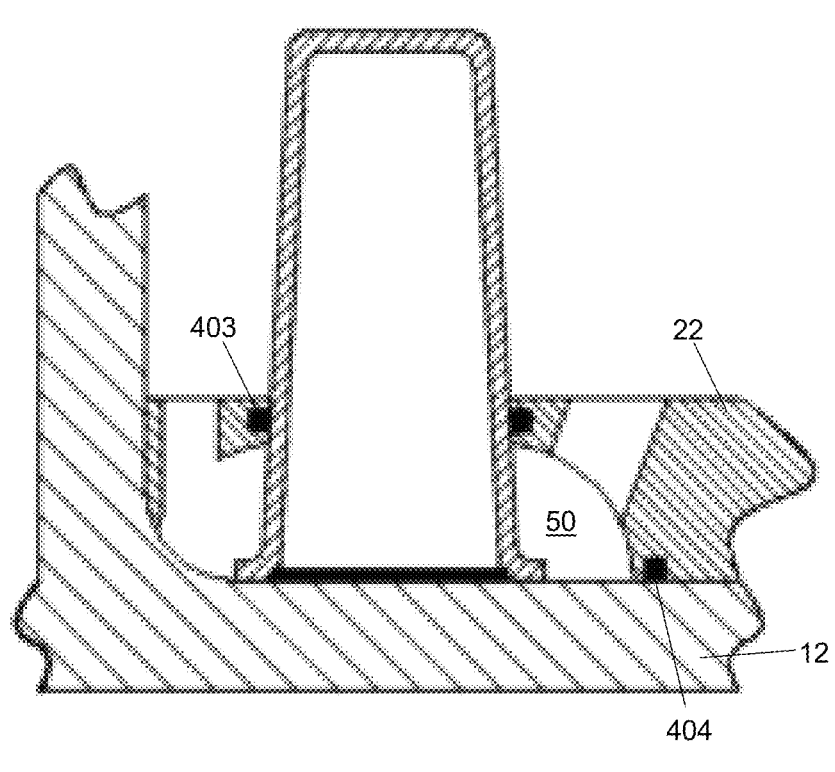
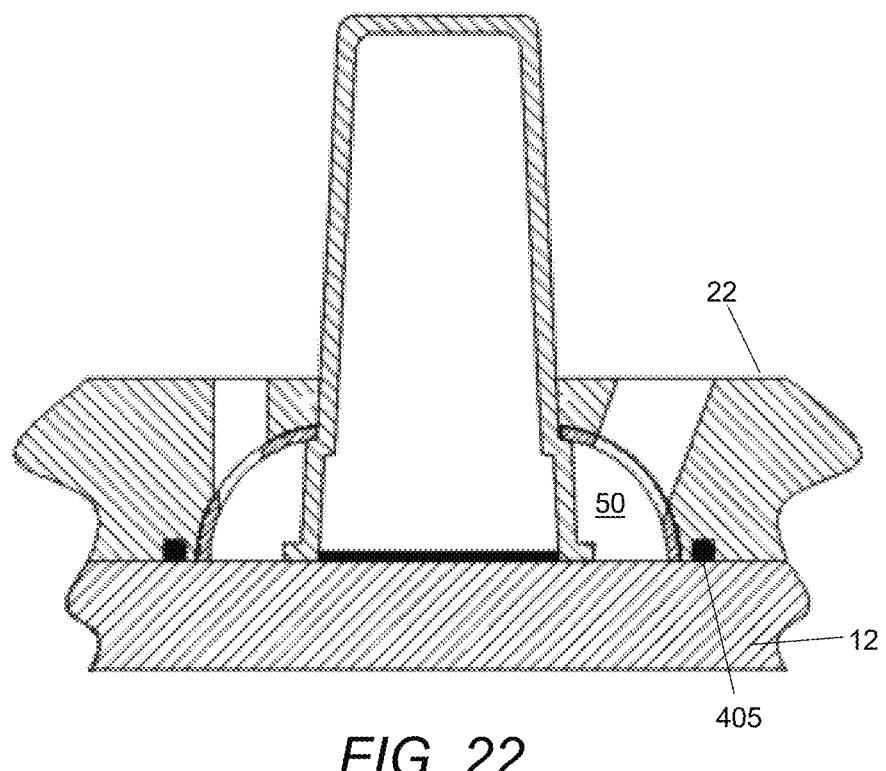
*FIG. 22*

JIG FOR SPARK CONTAINMENT CAPS

CROSS RELATED APPLICATION

This application claims priority to United Kingdom Patent Application GB 2400425.1, filed Jan. 11, 2024, the entire contents of which is hereby incorporated by reference.

FIELD OF THE INVENTION

The present invention relates to a method of securing a first structure to a second structure with fasteners and spark containment caps, and a jig for use in such a method. By way of example, the first and second structures may be parts of an aircraft wing.

BACKGROUND OF THE INVENTION

On some new aircraft wing designs, access to the inside of the wings (to tighten nuts) is not possible and therefore fasteners must be installed from the outside of the wing structure—this is known as "one-way assembly".

Other wing assembly concepts take this one step further in that the drilling and fastening is performed without disassembling the wing skin from the structure, i.e. wing skins are not removed for cleaning or de-burring. This is known as "single sided assembly".

Fasteners for aircraft fuel tanks, or other equivalent structures, may require a safety compliant protection from potential ignition sources due to a direct lightning attachment current or conducted current flowing through the fuel tank structure. Spark containment caps can provide this protection, but the cap may need to be fitted prior to the drilling operation. Accurate positioning of the cap and drilling is therefore imperative to ensure that the drill break-out and fastener installation occurs inside the cap.

SUMMARY OF THE INVENTION

A first aspect of the invention provides a method of securing a first structure to a second structure, the method comprising: providing a jig assembly comprising spark containment caps carried by a jig; mounting the jig assembly on a structure so that the spark containment caps and the jig contact the first structure; securing the spark containment caps to the first structure by injecting adhesive material into contact with the first structure and the spark containment caps and then curing the adhesive material; removing the jig after the adhesive material has cured; and securing the first structure to the second structure with fasteners, each fastener having a tail which is inserted through the first and second structures and into a respective one of the spark containment caps.

Optionally the jig comprises jig injection ports, and the adhesive material is injected into contact with each spark containment cap through a respective one of the jig injection ports.

Optionally each spark containment cap comprises a cap base which contacts the first structure and is located in a respective pocket of the jig and a cap body which receives the tail of a respective fastener and protrudes from the pocket; and the adhesive material is injected into each pocket via a respective one of the jig injection ports.

Optionally air displaced by the adhesive material escapes via exhaust ports during the injection of the adhesive material.

Optionally the jig comprises jig exhaust ports, and air displaced by the adhesive material escapes via the jig exhaust ports during the injection of the adhesive material.

Optionally the adhesive material is injected into contact with the jig; an adhesive bond is formed between the adhesive material and the jig on curing of the adhesive material; and the adhesive bond is broken to enable the removal of the jig.

Optionally the jig has a profiled jig feature which matches a corresponding profiled feature of the first structure, and the profiled jig feature is aligned with the corresponding profiled feature of the first structure to locate and orient the jig assembly as it is mounted on the structure.

Optionally the profiled jig feature contacts the corresponding profiled feature of the first structure.

Optionally the method further comprises forming fastener holes through the first and second structures after the adhesive material has cured, wherein the tails of the fasteners are inserted through the fastener holes.

Optionally the fastener holes are formed by drilling through the first and second structures in a single drilling operation.

Optionally the jig is removed before the first structure is secured to the second structure with the fasteners.

Optionally each spark containment cap is carried in a respective pocket of the jig.

Optionally the method further comprises clamping the jig to the first structure with a clamping force; and removing the clamping force to enable the jig to be removed.

Optionally the method further comprises pressing the spark containment caps against the first structure with the jig to clamp the spark containment caps to the first structure.

Optionally the method further comprises expanding the tails of the fasteners after they have been inserted into the spark containment caps.

Optionally the jig comprises resilient seal members, each resilient seal member contacts the first structure or a respective one of the spark containment caps, and each resilient seal member inhibits the escape of the adhesive material during injection.

Optionally the spark containment cap comprises: a cap base which contacts the first structure, a cap body which receives the tail of the fastener, and a ledge between the cap base and the cap body, wherein the ledge meets the cap body at a concave corner and the ledge meets the cap base at a convex corner; a skirt which is seated on the ledge, the skirt comprising an skirt injection port; and a pocket between the skirt and the cap base, wherein the adhesive material is injected into the pocket via the skirt injection port and cures to form an adhesive bond with the first structure, an adhesive bond with the cap base, and an adhesive bond with the skirt.

Optionally the first structure is a rib foot of an aircraft wing rib and the second structure is a skin of an aircraft wing.

Optionally the second structure provides a boundary of an aircraft fuel tank.

A further aspect of the invention provides a jig comprising a plate with a plurality of pockets each configured to receive a respective spark containment cap, each pocket having an opening terminating at a rim, and an axial hole opposite the opening; a plurality of jig injection ports each configured to enable adhesive material to be injected into a respective one of the pockets via the jig injection port; and a plurality of jig exhaust ports each configured to enable air to escape from a respective one of the pockets via the jig exhaust port.

BRIEF DESCRIPTION OF THE DRAWINGS

Embodiments of the invention will now be described with reference to the accompanying drawings, in which:

FIG. 5 is a plan view of a single rib foot;

FIG. 6 is a plan view of the rib foot of FIG. 5 after a jig assembly has been installed;

FIG. 21 shows a further alternative cap and jig design with O-rings; and

FIG. 22 shows a further alternative cap and jig design with a blow moulded cap, a skirt and an O-ring.

DETAILED DESCRIPTION OF EMBODIMENT(S)

Figure 1:
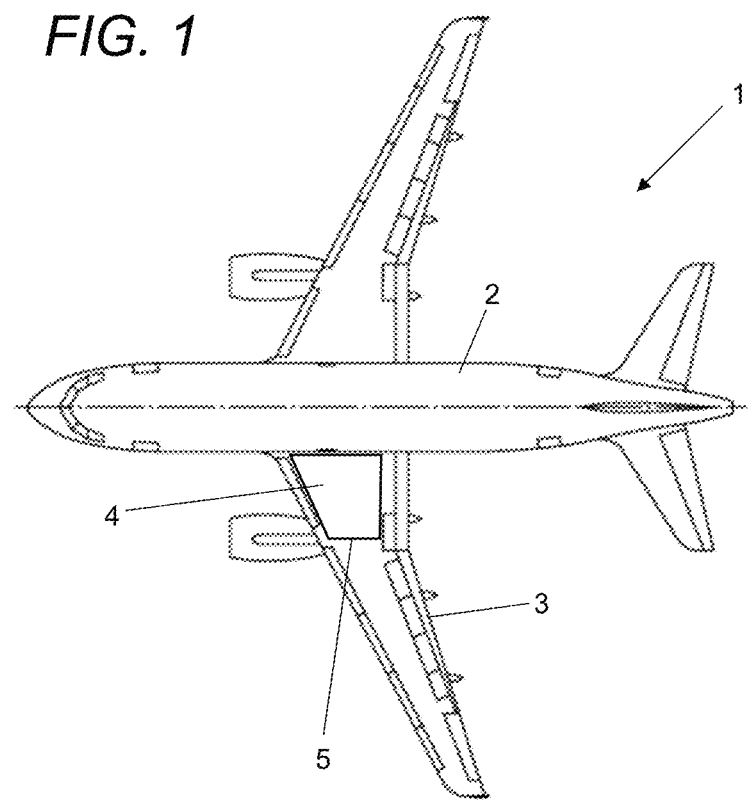
FIG. 1 shows an aircraft.

The aircraft 1 of FIG. 1 includes a fuselage 2 and wings 3 extending from the fuselage 2. Fuel tanks are formed in the fuselage and wings 3. One such fuel tank 4 is schematically shown in FIG. 1. The upper and lower boundaries of the tank 4 are provided by upper and lower skins of the wing 3, the fore and aft boundaries of the tank 4 are provided by forward and rear spars of the wing, and the inboard and outboard boundaries of the fuel tank 4 are provided by wing ribs 5.

The wing 3 is manufactured by assembling the skins, spars and ribs to form a wing box, then joining them together with fasteners. In a traditional method, the fasteners are two-sided fasteners (for example a nut and bolt) which require access to both sides of the joint to tighten the nut. In the examples below, the fasteners are blind fasteners which can be both inserted and expanded from one side only (outside the wing box).

Figure 2:
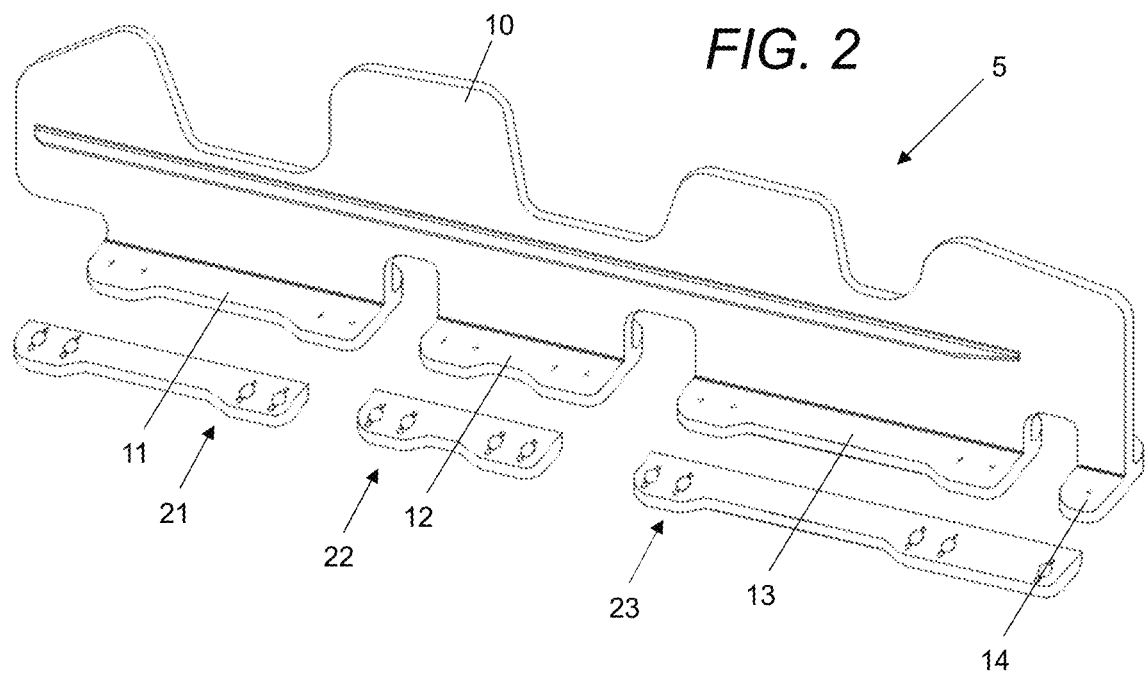
FIG. 2 shows a rib and three associated jigs.

FIG. 2 shows part of an exemplary one of the wing ribs 5 before assembly to form the wing box. The wing rib 5 comprises a web 10 and rib feet 11-14. During assembly, fasteners are used to attach the rib feet 11-14 to one of the wing skins. Mousehole recesses between the rib feet 11-14 provides passageways for skin-stiffening stringers (not shown) to pass as they extend along the span of the wing.

The larger rib feet 11-13 each have a single row of four fastener locations (each indicated by a cross) for inserting a fastener and the smaller rib foot 14 has a single fastener location. Before the wing rib 5 is assembled as part of the wing box, spark containment caps are fitted at each fastener location. Such caps provide a safety compliant protection from potential ignition sources due to a direct lightning attachment current or conducted current flowing through the fuel tank structure.

Three jigs 21-23 are shown in FIG. 2, each comprising pockets for receiving spark containment caps. Each jig 21, 22 has four pockets and the larger jig 23 has five pockets.

Figure 3:
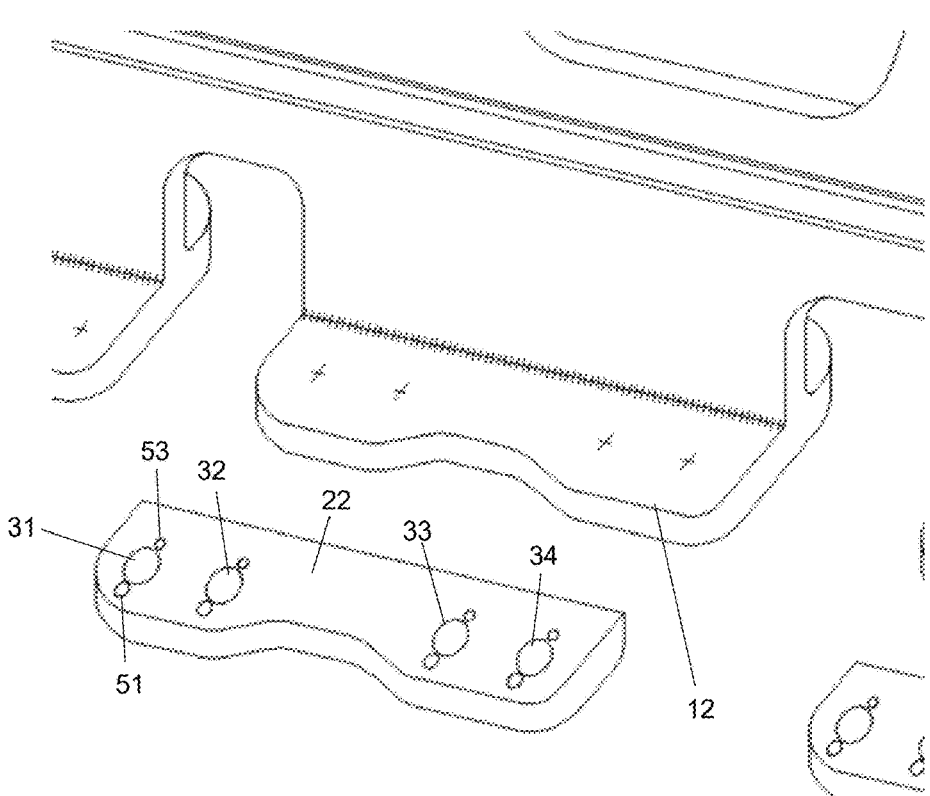
FIG. 3 is an enlarged view showing a single rib foot and associated jig assembly.

The jigs 21-23 are provided as separate parts (as shown in FIGS. 2 and 3) which are then mounted on the wing rib and optionally clamped to hold them in place.

An exemplary one of the rib feet 12 and its associated jig 22 are shown in FIGS. 3-9.

Figure 4:
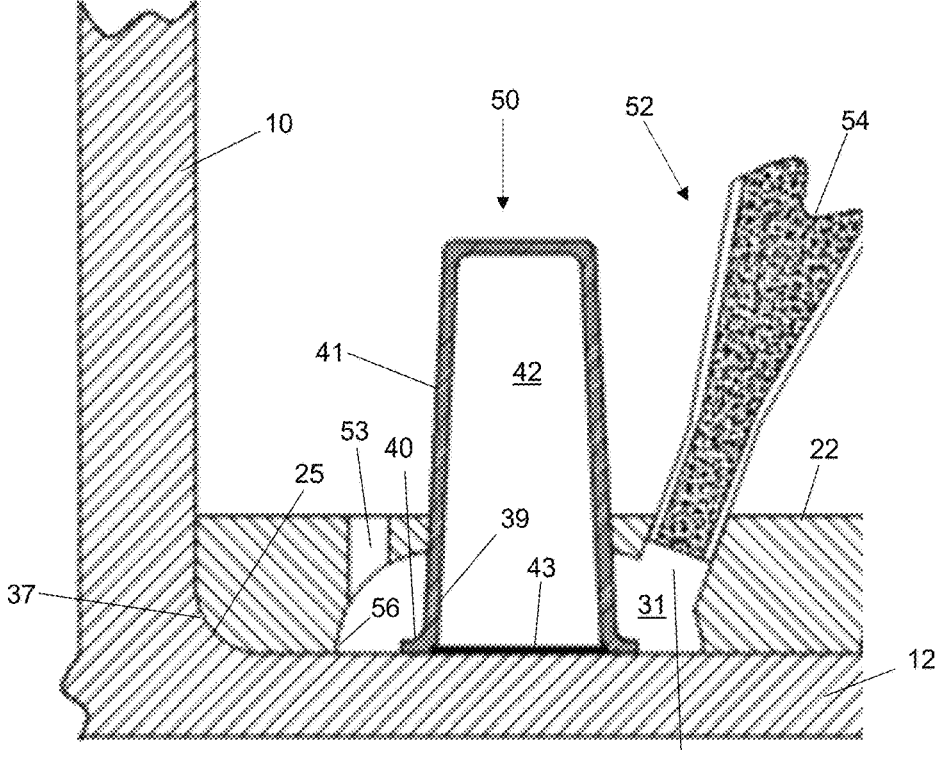
FIG. 4 shows an injection process for one of the caps.

The jig 22 comprises four pockets 31-34 each designed to carry a respective spark containment cap, one of such caps 50 being shown in FIG. 4.

Before being installed on the rib foot, spark containment caps are fitted into each of the four pockets 31-34 to provide a jig assembly. Note that the spark containment caps are not shown in FIG. 3 in order to make the pockets 31-34 visible.

The rib foot 12 is a flange which extends from a root where it meets the web 10, to a profiled outer edge 26 shown in FIG. 5.

The root of the rib foot has a profiled surface 25 or fillet with concave curvature where it meets the web 10 as shown in FIG. 4.

The jig 25 comprises a plate which extends from an inner edge where it meets the web 10 as shown in FIG. 4 to a profiled outer edge 36 shown in FIG. 6. As shown by comparison of FIG. 5 and FIG. 6, the planform shape of the profiled outer edge 26 of the rib foot matches the planform shape of the profiled outer edge 36 of the jig 22.

The inner edge of the jig 22 has a profiled surface 37, shown in FIG. 4, with convex curvature which contacts and mates with the concave profiled surface 25 at the root of the rib foot.

Each spark containment cap is carried in a respective pocket 31-34 of the jig. FIG. 4 shows an exemplary one of the spark containment caps 50 fitted into a pocket 31, and the other caps are mounted in the similar pockets 32-34. The pocket 31 has an opening terminating at a rim 56, and an axial hole opposite the opening which can be seen in FIG. 3.

The spark containment cap 50 comprises a cap base 39 with a rim 40; a cap body 41 with a cavity 42; and an insulating barrier 43 fitted to the cap base 39.

The cap base 39 is located in the pocket 31, and the cap body 41 protrudes from the pocket via the axial hole in the pocket 31. The cap base 39 has a tapering diameter which prevents it from passing through the axial hole in the pocket.

After the jig assembly is mounted on the rib foot as shown in FIG. 4, the rim 40 and the insulating barrier 43 of the cap each contact the rib foot 12. The planar lower surface of the jig 22 also contacts the planar upper surface of the rib foot 12.

Next the spark containment caps are secured to the rib foot 12 by injecting adhesive material 54 into contact with the rib foot 12 and the spark containment caps and then curing the adhesive material.

The injection process is shown in FIG. 4 for the exemplary one of the caps 50. The jig 22 comprises a jig injection port 51, and the adhesive material 54 is injected through the jig injection port 51 and into the pocket 31 between the cap base 39 and the jig 22 by an injection device 52.

The jig 22 also has a jig exhaust port 53, and air displaced from the pocket 31 by the adhesive material escapes via the jig exhaust port 53 during the injection of the adhesive material.

Emergence of adhesive material from the jig exhaust port 53 provides an indication that the pocket 31 is filled with adhesive material, so the operator of the injection device 52 can stop the injection process.

The adhesive material 54 may be a polysulphide fast curing sealant, a polythioether fast sealing sealant, or any other suitable adhesive material.

Figure 7:
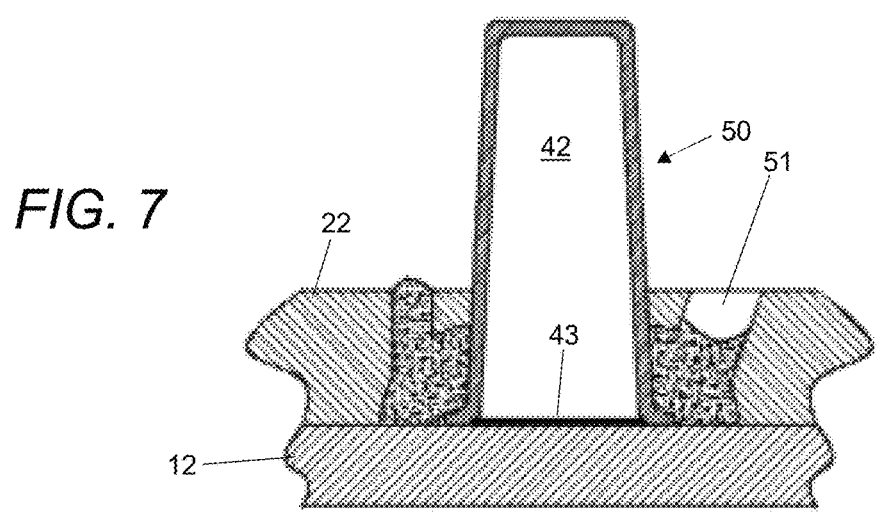
FIG. 7 shows the cap of FIG. 4 after the adhesive material has been injected.

FIG. 7 shows the cap 50 after the adhesive material 54 has been injected. The adhesive material 54 forms an annular bead which is in contact with the rib foot 12, the jig 22 and the outer surface of the cap base 39. Sealant material also fills the jig exhaust port 53 and part of the jig injection port 51 to form a pair of protruding stubs 57.

The adhesive material 54 is then allowed to cure at room temperature so it forms adhesive bonds with the rib foot 12, the jig 22 and the outer surface of the spark containment cap 50.

Figure 8:
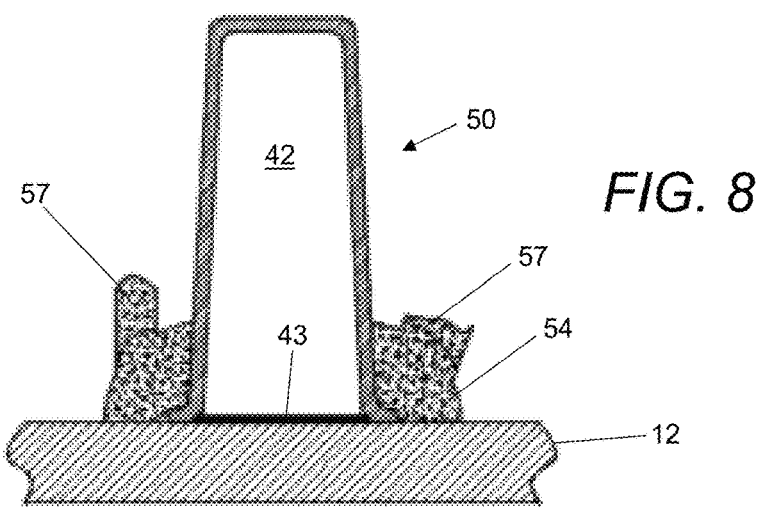
FIG. 8 shows the cap of FIG. 4 after the jig has been removed.

After the adhesive material has cured and solidified, the clamping force is removed to enable the jig 22 to be removed, leaving the adhered cap shown in FIG. 8. The adhesive bond between the adhesive material and the jig is broken to enable the removal of the jig. The protruding stubs 57 of cured adhesive material are then trimmed away.

To make it easy to break the adhesive bond between the adhesive material and the jig, the jig 22 may be made of a lower adhesion material than the rib foot 12 and the cap 50, such as polytetrafluoroethylene (PTFE) or silicone. Typically the rib foot 12 is made of Aluminium or carbon-fibre reinforced epoxy resin. Typically the body of the cap 50 is formed by injection moulding or similar. A suitable cap material is a glass filled polyetherimide (PEI) resin such as Ultem 2400 or Ultem 2310, available from SABIC Innovative Plastics Holding BV.

Figure 9:
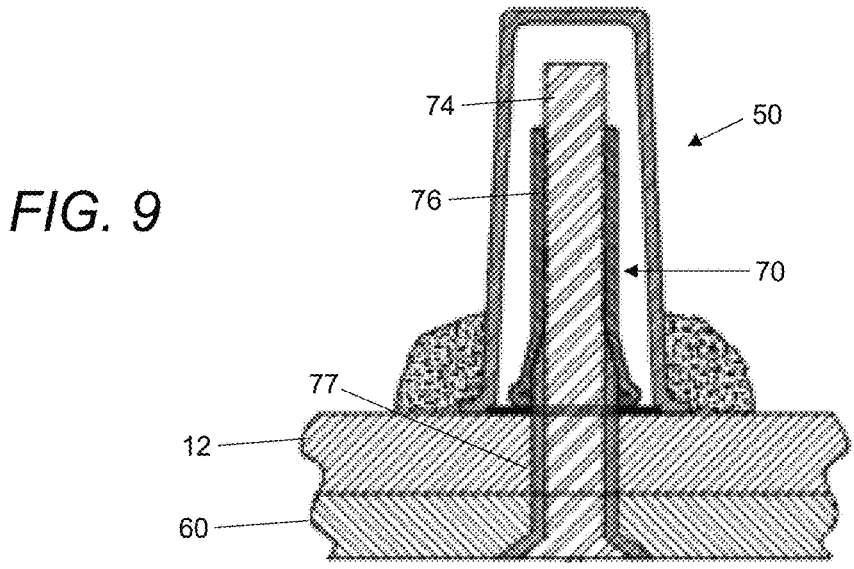
FIG. 9 shows a joint with a blind fastener inserted into the cap of FIG. 4.

When all of the caps have been secured and the jigs removed, the rib feet are secured to the wing skin by blind fasteners. FIG. 9 shows an example for the cap 50. The wing skin 60 is held against the rib foot 12, then fastener holes are drilled though the wing skin 60, the rib foot 12 and the insulating barrier 43. Drilled material may be removed by a vacuum extraction system to prevent accumulation inside the cap 50.

Note that the fastener holes are formed after the adhesive material 54 has cured, so the caps are not dislodged.

Note also that the fastener holes are formed by drilling through the wing skin 16, the rib foot 12 and the insulating barrier 43 in a single drilling operation.

The blind fasteners 70 are then inserted. Each blind fastener 70 has a tail which is inserted through a rib foot 12 and the wing skin 60 via a respective fastener hole and into a respective one of the spark containment caps.

In this example each jig is removed before the rib feet are secured with the fasteners. In other embodiments, the jigs may be left in place and only removed after the fasteners have been inserted. This is less preferred since access to the inside of the wing box will be required in order to remove the jigs and trimming of the stubs of cured adhesive material will be more difficult.

Note that the wing skin 60 is not removed for cleaning or de-burring between drilling and insertion of the blind fasteners 70. This is known as "single sided assembly".

On insertion, the tail of the blind fastener can fit though the fastener holes. The fastener 70 is known as a blind fastener, as it can be installed and expanded from only one side.

The blind fastener 70 comprises a bolt with an axially extending shaft 74, a head of the shaft, and a tubular sleeve 76 fitted around the shaft 74. The shaft 74 has a threaded portion on its outer circumference at one end which is the opposite end to the head of the shaft 75. The tubular sleeve 76 has a corresponding thread on its internal circumference such that the tubular sleeve 76 will travel along the shaft 74 as it is rotated. The blind fastener 70 also has a collar 77 provided around the head end of the bolt.

During installation, the tail of the fastener 70 is inserted into the cap 50, then the shaft 74 is rotated to cause the tubular sleeve 76 to be drawn towards the collar 77. When the tubular sleeve 76 contacts the collar 77, the tubular sleeve 76 deforms and splays outwardly forming an expanded portion or bulb which clamps against the insulating barrier 43 as shown in FIG. 9.

The material of the barrier 43 needs to be electrically insulating and able to withstand the bearing pressure of the fastener bulb. Examples of suitable materials include glass filled polyetherimide (PEI) such as ULTEM 2400 or 2300 (40% and 30%) available from SABIC Innovative Plastics Holding BV, or carbon (or glass) fibre reinforced polymer (CFRP or GFRP).

Figure 10:
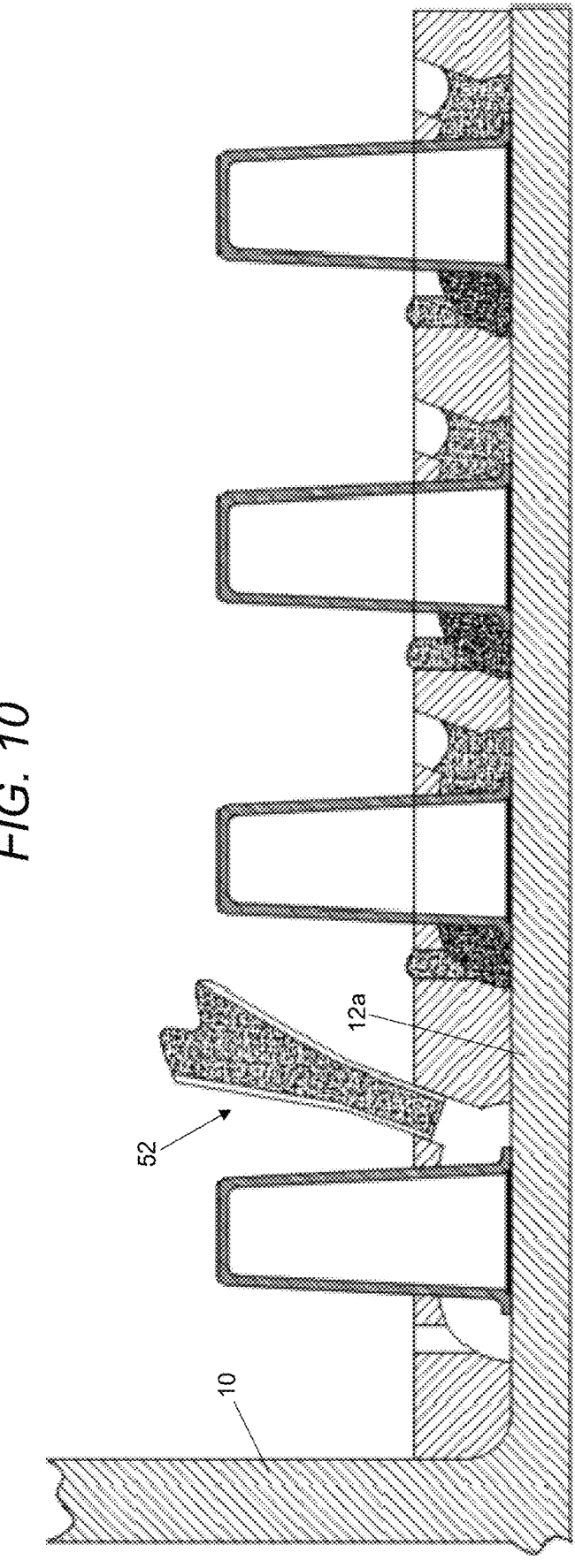
FIG. 10 shows an alternative jig assembly, with adhesive material being injected into one of the caps.

The injection process of FIG. 4 is repeated for all of the caps in each of the sockets 32-34: either one-after the other using a single injection device, or multiple injection-devices may be used simultaneously on different caps if needed to increase the speed of operation. FIG. 10 gives an example of a jig assembly in which caps are injected one-after the other by a single injection device 52. Note that the example of FIG. 10 shows a rib foot 12a with four rows of caps, compared with the rib foot 12 of FIG. 2 which only has a single row of caps.

The jig 22 has two profiled jig features which each match a corresponding profiled feature of the rib: namely the profiled outer edge 36 of the jig (FIG. 6) which matches the profiled outer edge 26 of the rib foot (FIG. 5); and the convex profiled surface 37 (FIG. 4) which contacts and mates with the concave profiled surface 25 at the root of the rib foot.

These profiled jig features 36, 37 are aligned with the corresponding profiled features 26, 25 of the rib 5 to locate and orient the jig assembly as it is mounted on the rib.

The profiled jig feature 37 contacts the corresponding profiled feature 25 of the rib, but the profiled jig feature 36 does not (it is merely used as a visual alignment aid).

Figure 11:
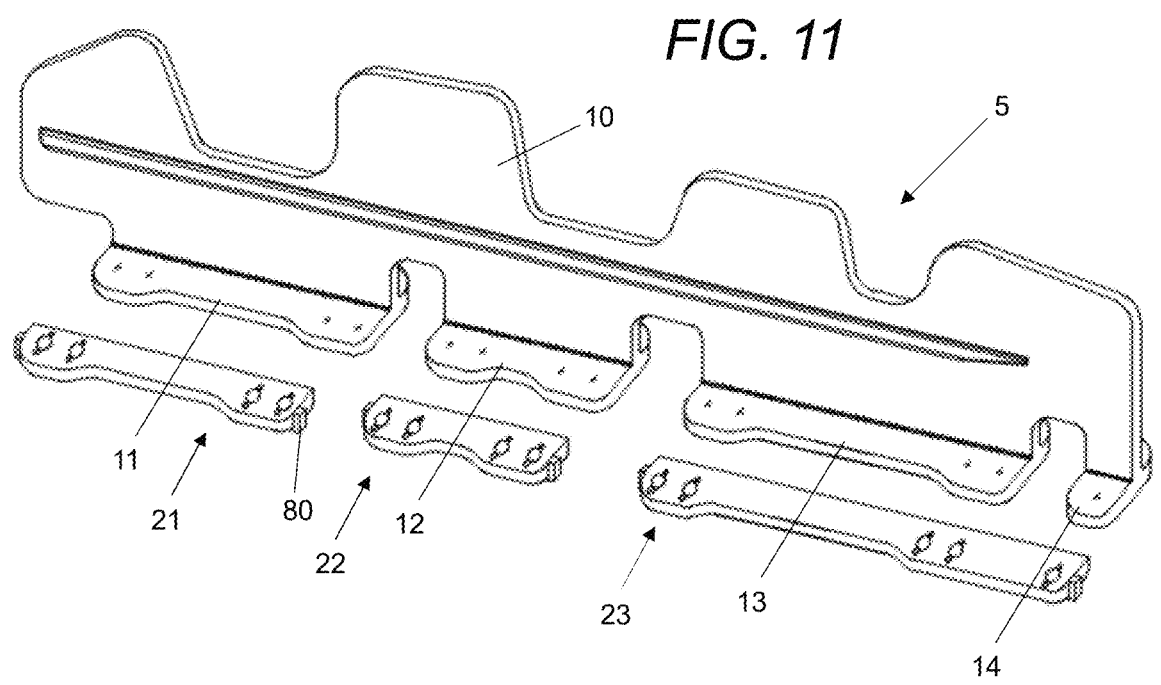
FIG. 11 shows a rib and three alternative jig assemblies.
Figure 12:
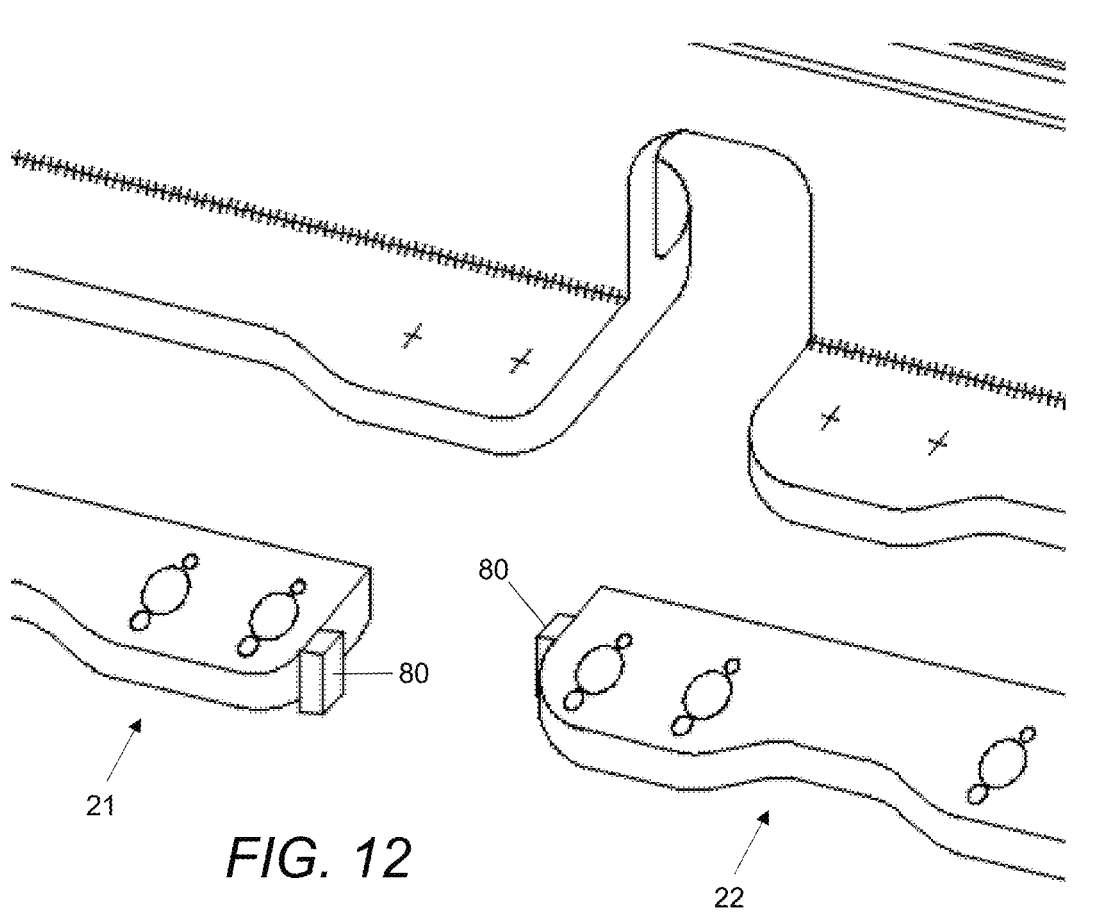
FIG. 12 is an enlarged view two of the alternative jig assemblies.

FIGS. 11 and 12 show an alternative embodiment in which the jigs have further profiled jig features which make it easier to positively locate and orient the jig assembly.

The jigs 21-23 in FIGS. 11 and 12 are almost identical to the jigs in FIGS. 2 and 3, so the same reference numbers are used for equivalent elements which will not be described again.

Figure 13:
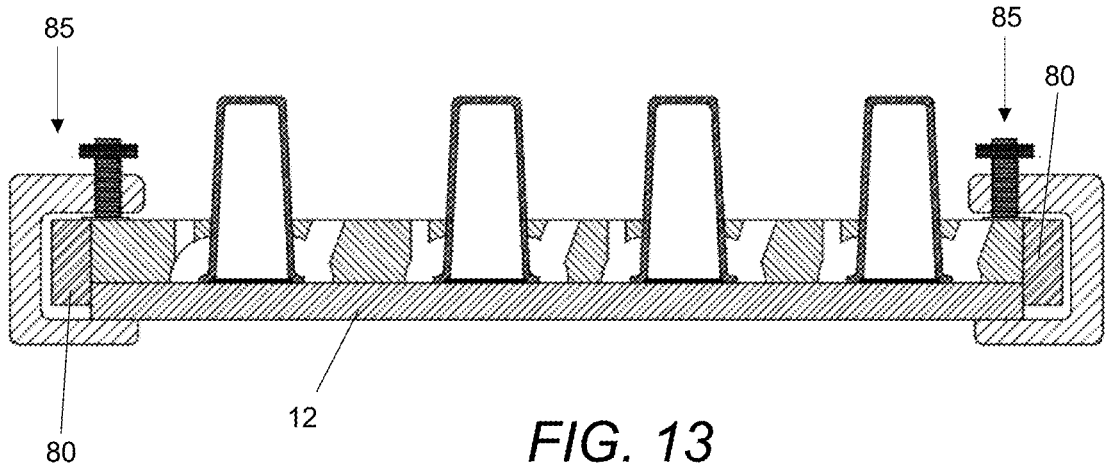
FIG. 13 shows a G-clamp arrangement.

Each jig has a pair of profiled jig features 80 which project below the lower surface of the jig as shown in FIG. 13. The projecting part of each profiled jig feature 80 contacts a respective edge of the rib foot 12 to accurately locate and orient the jig assembly.

Figure 14:
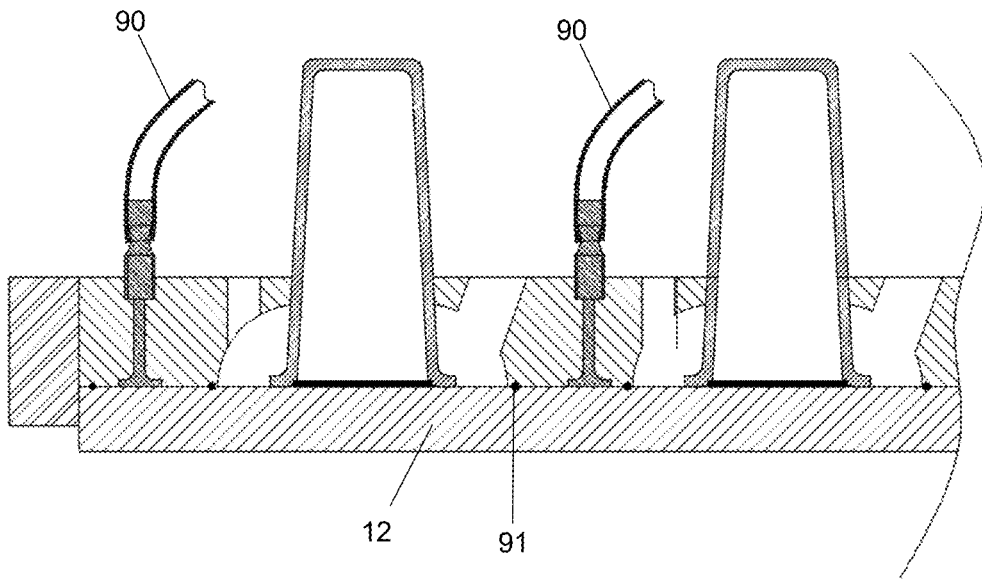
FIG. 14 shows a vacuum clamping arrangement.

As noted above, the jigs 21-23 are optionally clamped to hold them in place. FIG. 13 shows a first type of clamping arrangement which may be used for the jig assemblies. In this case, the clamping arrangement comprises a pair of G-clamps 85 at opposite ends of the jig assembly. FIG. 14 shows a second type of clamping arrangement: in this case a vacuum system applies a vacuum at the interface between the rib foot and the jig via multiple vacuum hoses 90 (two are shown, but there may be more). Note that the evacuated region is sealed by appropriate seals 91 to prevent adhesive material from being sucked into the vacuum system.

The clamping arrangements of FIGS. 13 and 14 not only press the jig against the rib foot 12, but also press the spark containment caps against the rib foot with the jig to clamp the spark containment caps to the rib foot. This prevents the caps from being dislodged during injection of the adhesive material, and ensures an intimate fit between the cap and the rib foot to prevent the ingress of adhesive material into the cavity 42 of the cap and leakage of adhesive material outside the bond area.

Figure 15:
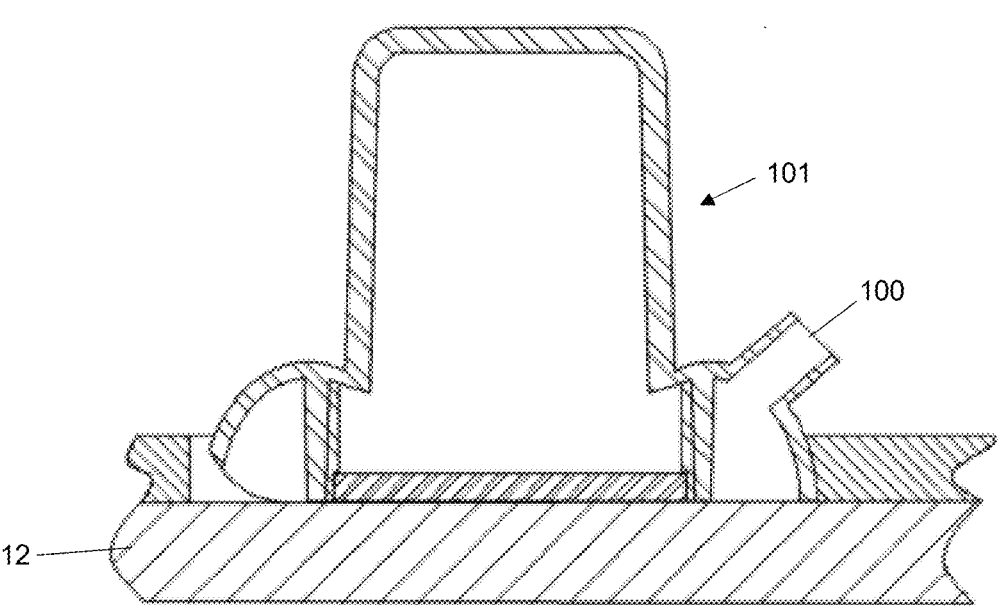
FIG. 15 shows an alternative cap and jig design with a cap skirt.

In the examples above the adhesive material is injected via jig injection ports into a pocket 31 between the cap base and the jig. In the alternative example of FIG. 15, the jig has no injection ports but instead the adhesive material is injected through an injection port 100 in a skirt of a spark containment cap 101.

Figure 16:
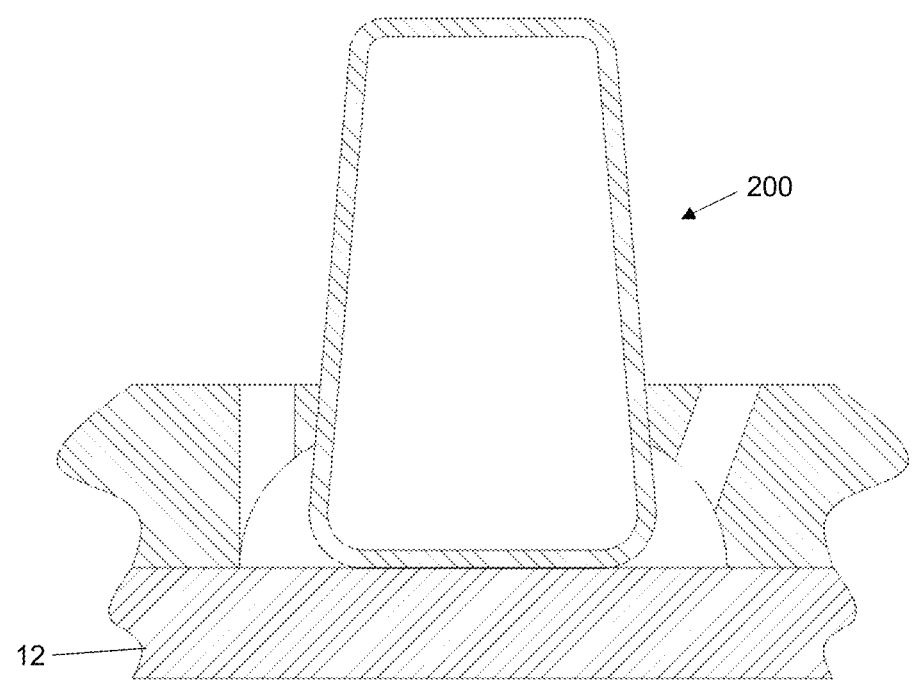
FIG. 16 shows a further alternative cap and jig design with a blow moulded cap.

FIG. 16 shows an alternative cap 200 which is manufactured as a single piece by blow moulding. Blow moulding has lower tooling and production costs compared to injection moulding, and can offer a quicker, easier and cheaper manufacturing alternative to typical spark containment caps. The cap 200 is required to be formed of a material which can be blow moulded, but which is also resistant to long term exposure to fuel. Examples of such a material could be Nylon PA6, PA66 and PA12. Another example may be ULTEM™ 2300, although this material would need to be injection moulded, not blow moulded. These materials may require additional treatment or primer paint application to enhance adhesive properties depending on the requirements of the caps 200.

Figure 17:
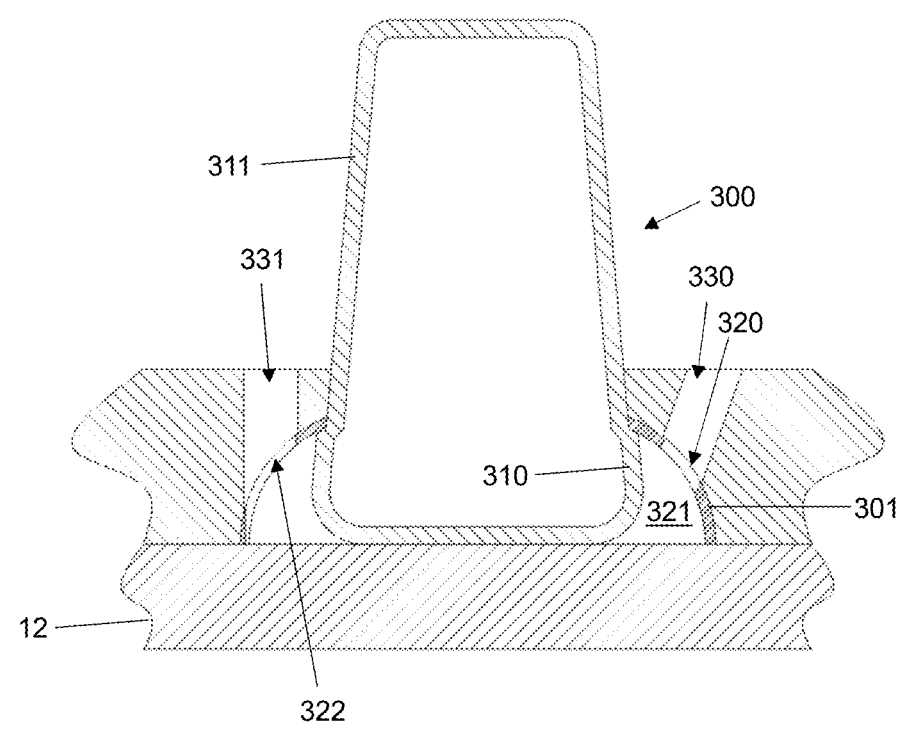
FIG. 17 shows a further alternative cap and jig design with a blow moulded cap and a skirt.

FIG. 17 shows another alternative blow-moulded cap 300 which is manufactured as a single piece by blow moulding and fitted with a separate skirt 301.

Figure 18:
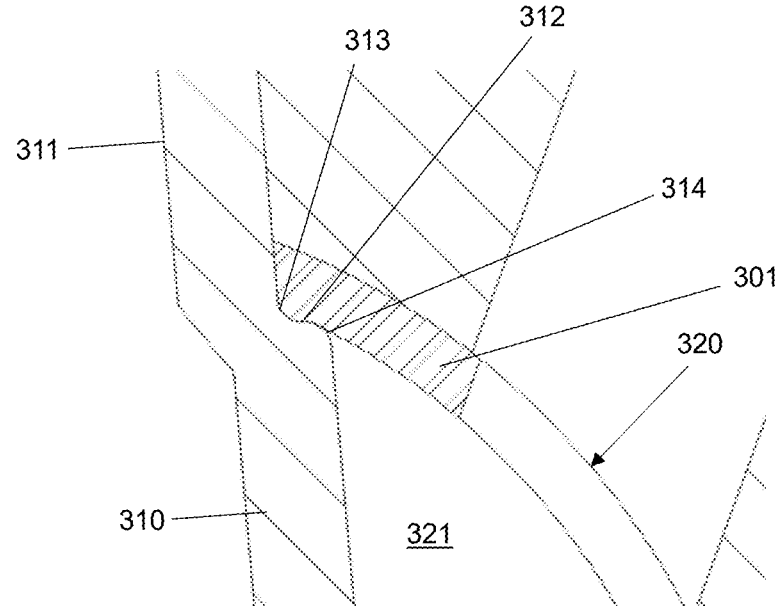
FIG. 18 is an enlarged view of the cap and jig design of FIG. 17.

The spark containment cap comprises: a cap base 310 which contacts the rib foot 12 and is located in a pocket in the jig, a cap body 311 which protrudes from the pocket and receives the tail of the fastener, and a ledge 312 between the cap base 310 and the cap body 311. As shown in FIG. 18, the ledge 312 meets the cap body 311 at a concave corner 313, and the ledge 312 meets the cap base at a convex corner 314. The skirt 301 is seated on the ledge 312 as shown in FIG. 18.

The skirt 301 comprises a skirt injection port 320 and a skirt exhaust port 322. The adhesive material is injected into a pocket 321 between the skirt 301 and the cap base 310 via a jig injection port 330 and the skirt injection port 320. The adhesive material cures to form an adhesive bond with the rib foot, an adhesive bond with the cap base 310, and an adhesive bond with the skirt 301.

Air displaced by the adhesive material escapes via the skirt exhaust port 322 and a jig exhaust port 331 during the injection of the adhesive material.

FIGS. 19-22 show alternative jig assemblies in which the jig comprises resilient seal members, formed from a resilient material such as an elastomer, which inhibit the escape of the adhesive material during injection. Each resilient seal member contacts the rib foot 12 or a respective one of the spark containment caps.

Figure 19:
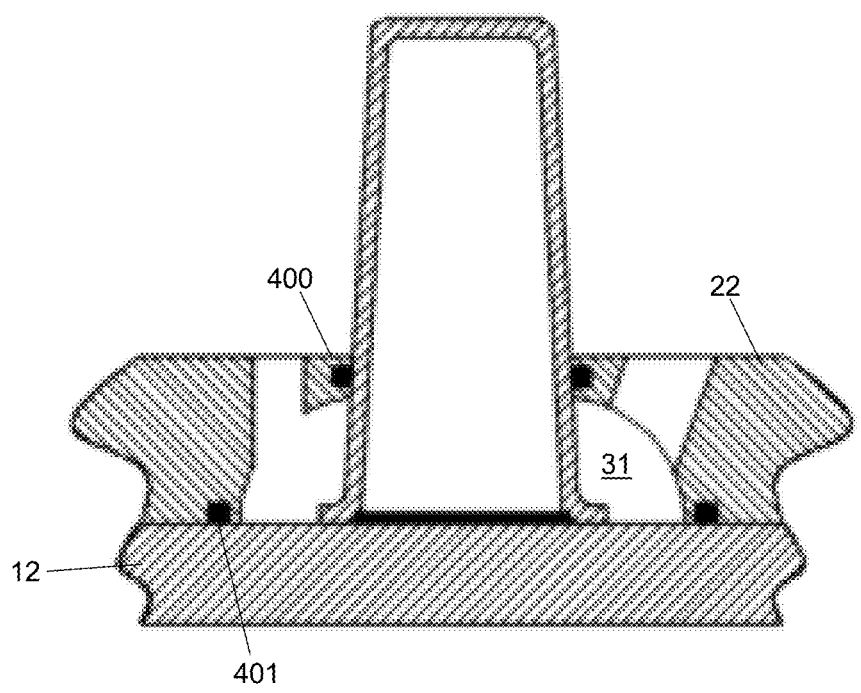
FIG. 19 shows a further alternative cap and jig design with O-rings.

In the case of FIG. 19 the resilient members comprise a first O-ring 400 around the axial hole of the pocket 50, and a second O-ring 401 around the opening of the pocket 50.

Figure 20:
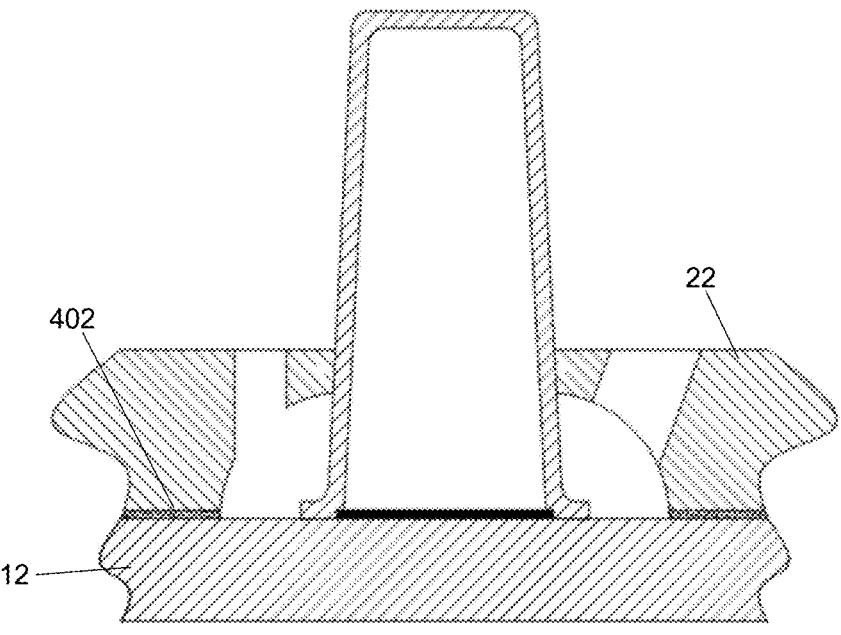
FIG. 20 shows a further alternative cap and jig design with a gasket.

In the case of FIG. 20, the resilient member comprises a gasket 402 between the jig 22 and the rib foot 12.

In the case of FIG. 21, the resilient members comprise a first O-ring 403 around the axial hole of the pocket 50, and a second O-ring 404 between the jig 22 and the rib foot 12.

In the case of FIG. 22, the resilient members comprise an O-ring 405 around the opening of the pocket 50.

In summary, the embodiments above provide fastener caps with cavities which contain ignition hazards (sparking or ejection of hot gas/particles).

The accurate positioning of the caps enables drilling break-out inside the cap whilst minimising the diameter of the cap required.

A bonding jig 22 is provided. In some embodiments the jig 22 comprises a plate with a plurality of pockets 31-34 each configured to receive a respective spark containment cap. Each pocket has an opening terminating at a rim 56, and an axial hole opposite the opening through which the cap can protrude. The jig has a plurality of jig injection ports 51 each configured to enable adhesive material to be injected into a respective one of the pockets 31-34 via the jig injection port; and a plurality of jig exhaust ports 53 each configured to enable air to escape from a respective one of the pockets 31-34 via the jig exhaust port. Optionally a resilient member may be provided around each opening and/or around each axial hole.

The bonding jig enables multiple caps to be easily placed in precise positions on the structure and includes a means of injecting and forming a consistent and robust bead of adhesive or sealant around the base of each cap.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of securing a first structure to a second structure, the method comprising: providing a jig assembly comprising spark containment caps carried by a jig; mounting the jig assembly on the first structure so that the spark containment caps and the jig contact the first structure; securing the spark containment caps to the first structure by injecting adhesive material into contact with the first structure and the spark containment caps and then curing the adhesive material; removing the jig after the adhesive material has cured; and securing the first structure to the second structure with fasteners, each of the fasteners having a tail which is inserted through the first and second structures and into a respective one of the spark containment caps.

2. A method according to claim 1, wherein the jig comprises jig injection ports, and the adhesive material is injected into contact with each of the spark containment caps through a respective one of the jig injection ports.

3. A method according to claim 2, wherein each of the spark containment caps comprises a cap base which contacts the first structure and is located in a respective pocket of the jig and a cap body which receives the tail of a respective one of the fasteners and protrudes from the pocket; and the adhesive material is injected into each of the pockets via a respective one of the jig injection ports.

4. A method according to claim 1, wherein air displaced by the adhesive material escapes via exhaust ports during the injection of the adhesive material.

5. A method according to claim 4, wherein the jig comprises jig exhaust ports, and air displaced by the adhesive material escapes via the jig exhaust ports during the injection of the adhesive material.

6. A method according to claim 1, wherein the adhesive material is injected into contact with the jig; an adhesive bond is formed between the adhesive material and the jig on curing of the adhesive material; and the adhesive bond is broken to enable the removal of the jig.

7. A method according to claim 1, wherein the jig has a profiled jig feature which matches a corresponding profiled feature of the first structure, and the profiled jig feature is aligned with the corresponding profiled feature of the first structure to locate and orient the jig assembly as it is mounted on the structure.

8. A method according to claim 7, wherein the profiled jig feature contacts the corresponding profiled feature of the first structure.

9. A method according to claim 1, further comprising forming fastener holes through the first and second structures after the adhesive material has cured, wherein the tails of the fasteners are inserted through the fastener holes.

10. A method according to claim 9, wherein the fastener holes are formed by drilling through the first and second structures in a single drilling operation.

11. A method according to claim 1, wherein the removing of the jig is performed before the securing the first structure to the second structure with the fasteners.

12. A method according to claim 1, wherein each of the spark containment caps is carried in a respective pocket of the jig.

13. A method according to claim 1, further comprising clamping the jig to the first structure with a clamping force; and removing the clamping force to enable the jig to be removed.

14. A method according to claim 1, further comprising pressing the spark containment caps against the first structure with the jig to clamp the spark containment caps to the first structure.

15. A method according to claim 1, further comprising expanding the tails of the fasteners after they have been inserted into the spark containment caps.

16. A method according to claim 1, wherein the jig comprises resilient seal members, each of the resilient seal members contacts the first structure or a respective one of the spark containment caps, and each of the resilient seal members inhibits the escape of the adhesive material during injection.

17. A method according to claim 1, wherein each of the spark containment caps comprises: a cap base which contacts the first structure, a cap body which receives the tail of the fastener, and a ledge between the cap base and the cap body, wherein the ledge meets the cap body at a concave corner and the ledge meets the cap base at a convex corner; a skirt which is seated on the ledge, the skirt comprising a skirt injection port; and a pocket between the skirt and the cap base, wherein the adhesive material is injected into the pocket via the skirt injection port and cures to form an adhesive bond with the first structure, an adhesive bond with the cap base, and an adhesive bond with the skirt.

18. A method according to claim 1, wherein the first structure is an aircraft wing spar or a foot of an aircraft wing rib; and the second structure is a skin of an aircraft wing.

19. A method according to claim 1, wherein the second structure provides a boundary of an aircraft fuel tank.

\* \* \* \* \*